United States Patent
Shu et al.

(10) Patent No.: US 7,409,603 B2
(45) Date of Patent: Aug. 5, 2008

(54) SYSTEM AND METHOD FOR TESTING HARDWARE DEVICES

(75) Inventors: San-Yi Shu, Shenzhen (CN); De-Hua Dang, Shenzhen (CN); Yi-Ching Weng, Tu-Cheng (TW)

(73) Assignees: Hong Fu Jin Precision Industry (Shenzhen) Co., Ltd., Bao-an District, Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 609 days.

(21) Appl. No.: 11/025,576

(22) Filed: Dec. 29, 2004

(65) Prior Publication Data

US 2006/0136785 A1  Jun. 22, 2006

(30) Foreign Application Priority Data

Mar. 12, 2004  (TW) .............................. 93106640 A

(51) Int. Cl.
G06F 11/00  (2006.01)
(52) U.S. Cl. ....................................................... 714/45
(58) Field of Classification Search .................. 714/25, 714/26, 27, 32, 37, 38, 45, 46, 48
See application file for complete search history.

(56) References Cited

U.S. PATENT DOCUMENTS 6,002,868 A * 12/1999 Jenkins et al. .............. 717/105
6,002,871 A * 12/1999 Duggan et al. .............. 717/135
6,279,124 B1 * 8/2001 Brouwer et al. ............... 714/38
6,393,588 B1   5/2002 Hsu et al. ...................... 714/43
7,076,713 B1 * 7/2006 Hess ........................... 714/741
7,200,775 B1 * 4/2007 Rhea et al. .................... 714/27
2002/0042897 A1 * 4/2002 Klein et al. .................. 714/718
2003/0182601 A1 * 9/2003 Richardson ................... 714/46
2007/0220487 A1 * 9/2007 Wu et al. ..................... 717/124

* cited by examiner

Primary Examiner—Nadeem Iqbal
(74) Attorney, Agent, or Firm—Morris Manning Martin LLP; Tim Tingkang Xia, Esq.

(57) ABSTRACT

A system for testing hardware devices applies a multi-level architecture including a Graphical User Interface (GUI) level (10), a Dynamic Link Library (DLL) level (20), and a device driving level (30). The GUI level selects test items and test units for a test project based on test requirements, stores the test project in a test script file, configures test parameters for performing the test project, and stores the test parameters in a test parameter configuration file. The DLL level transmits test results of each hardware device (108) to the GUI level. The device driving level includes a device driving module (107) for obtaining test information on the hardware device, comparing the test information with standard information in the test parameter configuration file, and generating a comparison result. A related method is also disclosed.

9 Claims, 4 Drawing Sheets

SYSTEM AND METHOD FOR TESTING HARDWARE DEVICES

BACKGROUND OF THE INVENTION

1. Field of the invention

The present invention relates to electronic device testing systems and methods, and particularly to a system and method which can test hardware devices of a computer.

2. Prior Art of the invention

Original Equipment Manufacturing (OEM) in the computer industry includes the manufacturing of all kinds of components and products, such as motherboards, Central Processing Units (CPUs), Compact Disc Read-Only Memories (CDROMs), and modems. Customers continue to demand increased performance and reliability of the products purchased, and OEM manufacturers need to ensure that their products meet high quality standards. OEM manufacturers routinely conduct numerous functional tests on the finished products before the products are shipped to customers.

Nowadays, function testing has become very important in the field of motherboard production and computer assembly. There are all kinds of test software tools available for testing computer products. Some of these utilities focus on a particular device such as a hard disk drive and its associated control electronics. The art of these utilities has been disclosed in literature such as U.S. Pat. No. 6,393,588 issued on May 21, 2002 and entitled "Testing of USB Hub." The patent discloses a test apparatus for testing the function of a USB (Universal Serial Bus) hub under the control of a USB host computer. However, this test apparatus and like tools can only test one kind of computer product. They are not intended to test all kinds of computer products. Many OEM manufacturers produce a variety of computer products, and need a testing system and method which can be used to test all the computer products produced.

Accordingly, what is needed is a hardware device testing system and method which readily provides functional testing of all kinds of computer products.

SUMMARY OF THE INVENTION

A main objective of the present invention is to provide a system for testing hardware devices which can rapidly test one or more hardware devices.

Another objective of the present invention is to provide a method for testing hardware devices which can rapidly test one or more hardware devices.

To accomplish the first objective, a system for testing hardware devices in accordance with a preferred embodiment of the present invention has a multi-level architecture. The multi-level architecture comprises a Graphical User Interface (GUI) level, a Dynamic Link Library (DLL) level, and a device driving level.

The GUI level is for selecting test items and test units for a testing project based on testing requirements, storing the test project in a test script file, configuring test parameters for performing the test project, and storing the test parameters in a test parameter configuration file. The GUI level comprises a number of graphical user interfaces. The graphical user interfaces are: a test project editing interface for selecting test items and test units for a test project based on test requirements, and storing the test project in the test script file; a test parameter configuring interface for configuring test parameters for performing the test project, and generating a test parameter configuration file; and a test project performing interface for loading the test script file and the test parameter configuration file, controlling test procedures, and displaying the test results.

The DLL level is for transmitting test results of the hardware device to the GUI level, and includes a DLL module and a plurality of Application Programming Interfaces (APIs). The DLL module includes comprises a plurality of DLL files corresponding to the hardware devices, for transmitting test results of the hardware devices. The device driving level includes a device driving module for obtaining test information on each hardware device, comparing the test information with the standard information in the test parameter configuration file, and generating a comparison result.

To achieve the second objective, the present invention provides a method for testing hardware devices, which can be performed by utilizing the above-described system. The method comprises the steps of: (a) selecting test items and test units for a test project, and storing the test project in a test script file; (b) configuring test parameters, and generating a test parameter configuration file; (c) loading the test script file and the test parameter configuration file; (d) loading a DLL file corresponding to one of the test items in the test script file; (e) loading a device driving interface corresponding to the DLL file; (f) testing a hardware device corresponding to the test item based on the test configuration file, and recording the test results; (g) transmitting the test results to the DLL module; (h) closing the device driving interface; and (i) determining whether any test items have not been tested, and displaying the test results if all test items have been tested.

Other objects, advantages and novel features of the present invention will be drawn from the following detailed description of the preferred embodiment and a preferred method of the present invention with the attached drawings, in which:

DETAILED DESCRIPTION OF THE PREFERRED EMBODIMENT

In the following description, a test project is a plan for testing hardware devices, and includes one or more test items. Each test item represents a hardware device to be tested, such as a Central Processing Unit (CPU), a Compact Disc Read-Only Memory (CD-ROM), or a modem. Each test item includes one or more test units. Each test unit represents a test feature of a test item. For example, the test units for a CPU may comprise a CPU number, a CPU signature, a CPU brand identification (ID), a CPU ratio, a system bus frequency, and a CPU vendor ID.

Figure 1:
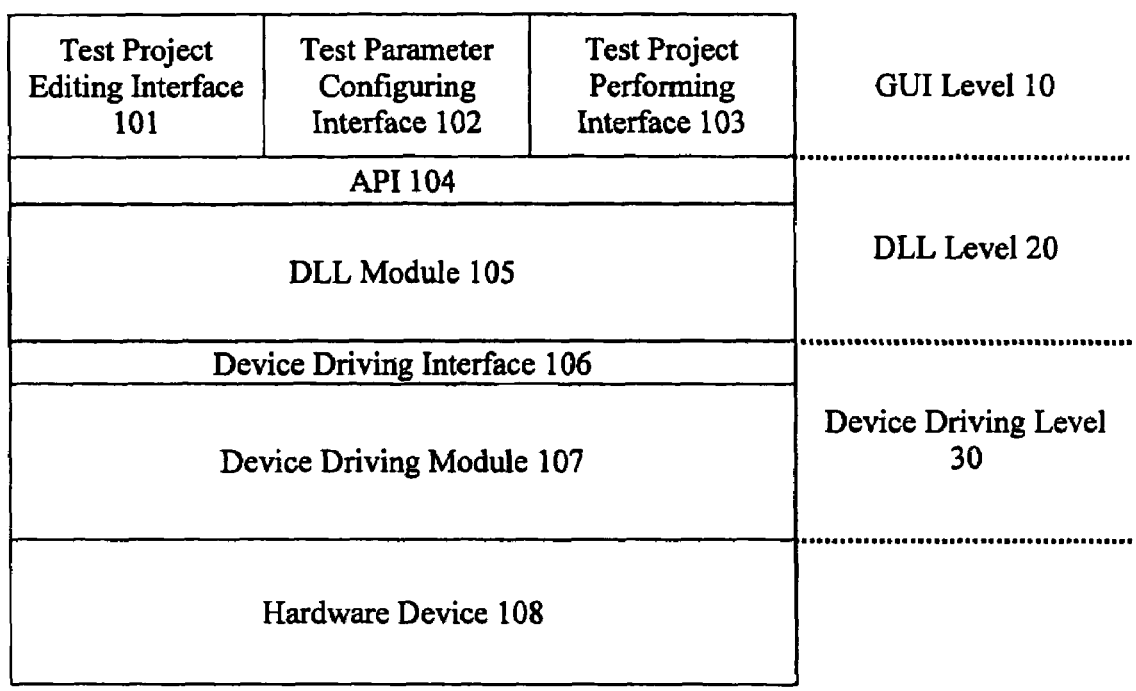
FIG. 1 is essentially a schematic diagram of hardware and software infrastructure of a system for testing hardware devices in accordance with the preferred embodiment of the invention.

Now referring to the drawings, FIG. 1 is essentially a schematic diagram of hardware and software infrastructure of a system for testing hardware devices (hereafter, "the system") in accordance with the preferred embodiment of the present invention. The system is connected to one or more hardware devices 108 to be tested (only one shown). The system applies a multi-level architecture including a Graphical User Interface (GUI) level 10, a Dynamic Link Library (DLL) level 20, and a device driving level 30.

The GUI level 10 comprises a test project editing interface 101, a test parameter configuring interface 102, and a test project performing interface 103. The test project editing interface 101 is operable for selecting test items and test units for a test project, the selection being based on test requirements, and thereby generating the test project. The test project is stored in a test script file in a designated format. The test parameter configuring interface 102 is provided for configuring test parameters for performing the test project. The test parameters are stored in a test parameter configuration file. The test project performing interface 103 is for loading the test script file and the test parameter configuration file, and controlling test procedures and test modes according to test requirements. For example, via the test project performing interface 103, users can instruct that one or more test units be skipped, or instruct that a test unit be tested repeatedly.

The DLL level 20 comprises a plurality of Application Programming Interfaces (APIs) 104 (only one shown), and a DLL module 105. The DLL module 105 includes a plurality of DLL files. Each DLL file corresponds to a particular hardware device 108 and a particular API 104. Before starting the testing of a hardware device 108, the test project performing interface 103 loads a DLL file corresponding to the hardware device 108 through the corresponding API 104. After finishing the testing of the hardware device 108, the DLL file transmits test results to the test project performing interface 103 through the API 104.

The device driving level 30 comprises a plurality of device driving interfaces 106 (only one shown) and a device driving module 107. The device driving module 107 includes a plurality of Windows Kernel Driver (WKD) programs. In the preferred embodiment, the system is based on a windows operating system, under which each WKD program corresponds to a particular hardware device 108. Additionally, each WKD program corresponds to a particular device driving interface 106. The (WKD) program is used for driving the hardware device 108, in order to obtain test information on the hardware device 108. The device driving module 107 is for obtaining test information on the hardware device 108 through the corresponding WKD program, and performing the testing of the hardware device 108.

Figure 2:
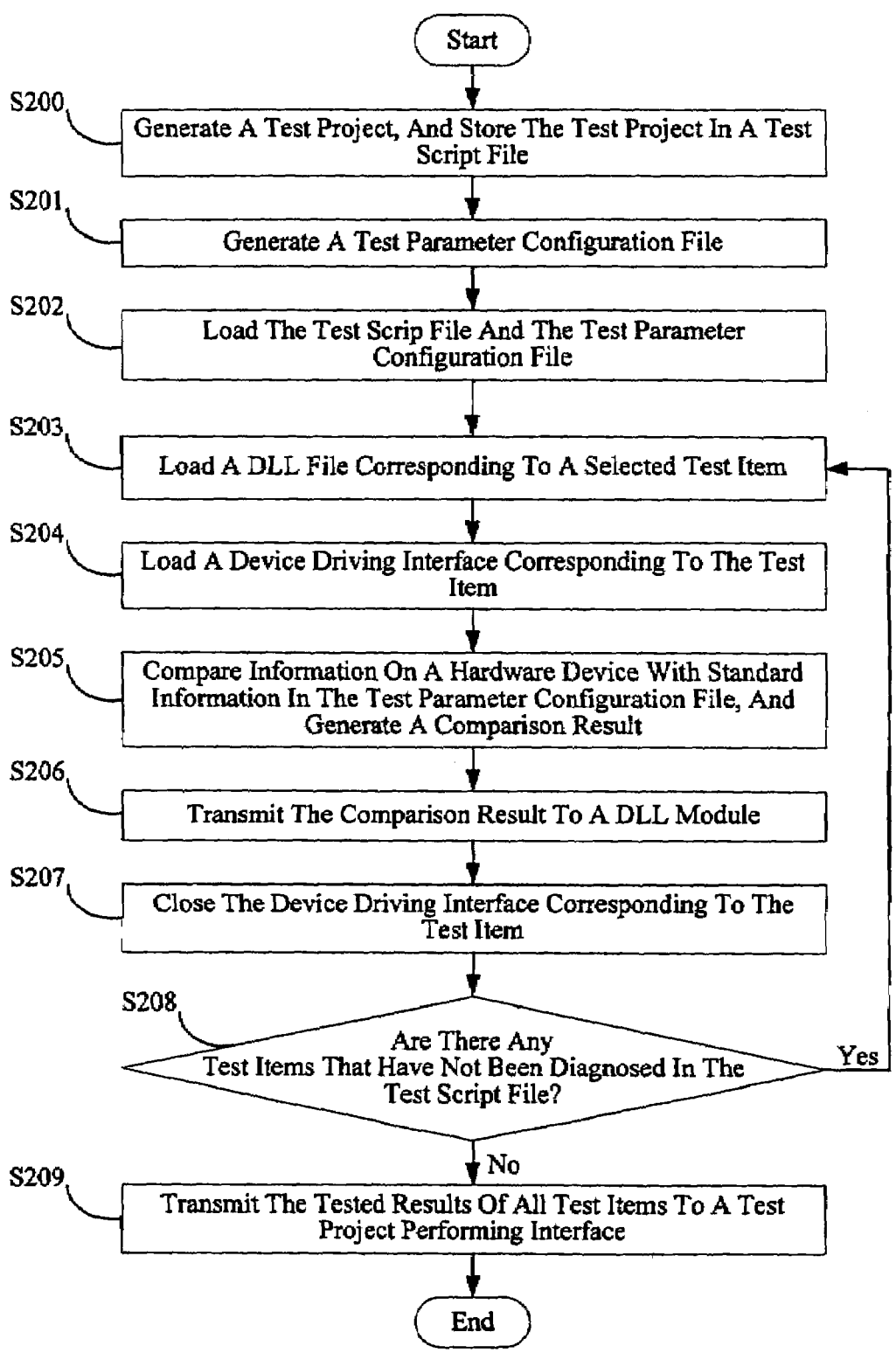
FIG. 2 is a flowchart of the preferred method for testing hardware devices by utilizing the system of FIG. 1.

FIG. 2 is a flowchart of the preferred method for testing hardware devices by utilizing the above-described system. In step S200, the test project editing interface 101 selects test items and test units for a test project according to test requirements, thereby generates the test project, and stores the test project in a test script file in a designated format. In step S201, the test parameter configuring interface 102 sets standard information on the hardware devices 108 to be tested as test parameters, and generates a corresponding test parameter configuration file. The test parameter configuration file is used for determining test information. For example, the standard information on a hardware device 108 in the test parameter configuration file regarding a CPU might be "Intel P4 CPU," but the CPU tested is not an Intel P4 CPU. In such case, the test project performing interface 103 displays a comparison result "not an Intel P4 CPU."

In step S202, the test project performing interface 103 loads the test script file, and sets a storing path for the test parameter configuration file. When the test script file is executed, the test project performing interface 103 loads the test parameter configuration file according to the storing path, thereby obtains standard information on all test units of each test item from the test parameter configuration file, and obtains information on the test units of the test items from the test script file. In step S203, the test project performing interface 103 loads a DLL file through an API 104 corresponding to a test item in the test project. In step S204, the DLL module 105 loads a device driving interface 106 corresponding to the test item.

In step S205, the device driving module 107 obtains test information on the hardware device 108 corresponding to the test item, via the corresponding WKD program. The device driving module 107 compares the test information on the hardware device 108 with the standard information in the test parameter configuration file, and generating a comparison result. A test result comprises a name of the test item, names of test units in the test item, result codes, and comparison results (i.e. remark information). In step S206, the device driving module 107 transmits the test result to the DLL module 105 via the device driving interface 106. Then, in step S207, the DLL module 105 closes the device driving interface 106 corresponding to the test item.

In step S208, the test project performing interface 103 determines whether there are any test items that have not been tested in the test script file. If there are any test items that have not been tested, the procedure returns to step S203 described above. If all test items have been tested, in step S209, the DLL module 105 transmits the test results of all the test items to the test project performing interface 103 via respective APIs 104, whereupon the test project performing interface 103 displays the test results.

Figure 3:
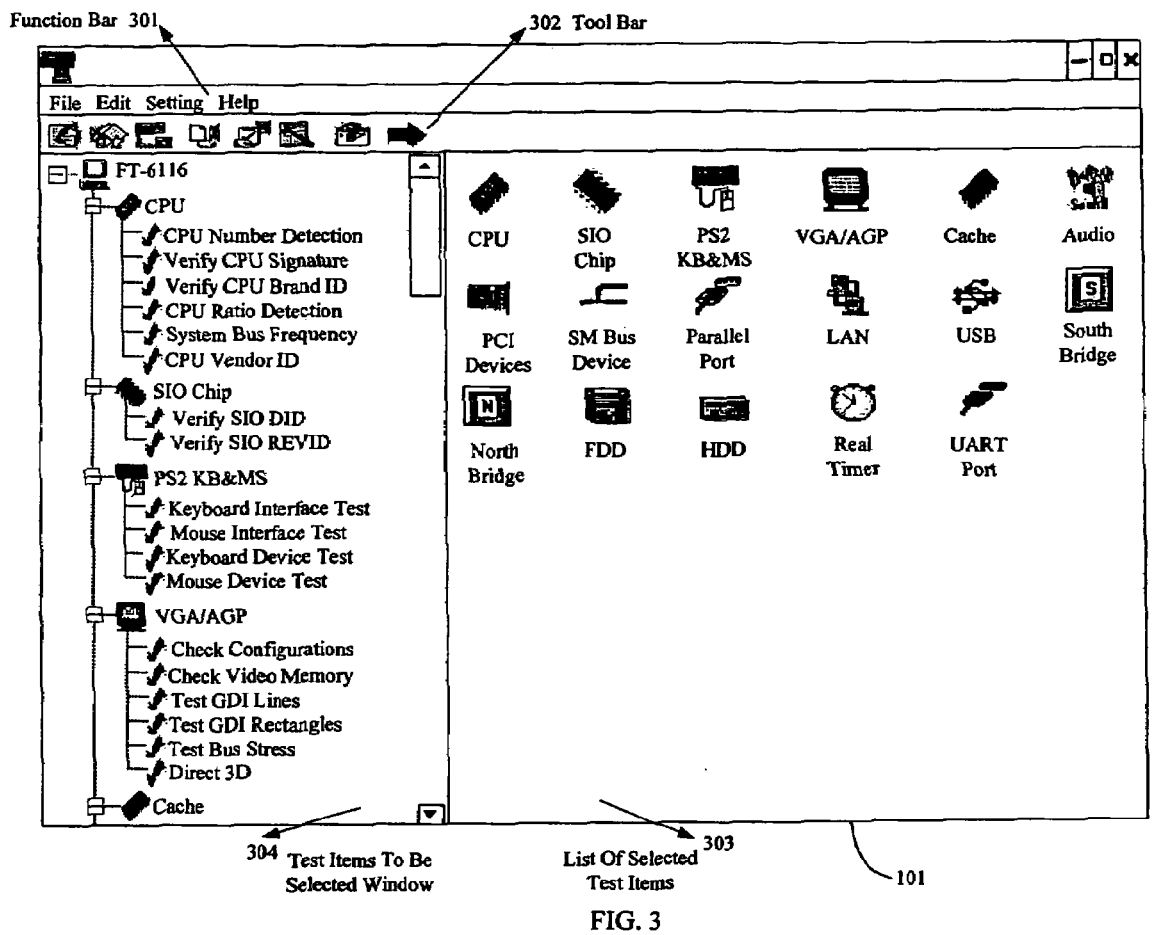
FIG. 3 is a screen capture of an exemplary test project editing interface of the system of FIG. 1.

FIG. 3 is a screen capture of an exemplary test project editing interface 101. Through the test project editing interface 101, a test project can be created, edited, and stored in a test script file in a designated format. The test project editing interface 101 comprises a function bar 301, a tool bar 302, a list of selected test items 303, and a test items to be selected window 304. The function bar 301 provides a plurality of function keys for editing the test project. The tool bar 302 provides a plurality of shortcut keys corresponding to certain of the function keys of the function bar 301. The list of selected test items 303 displays test items which have been selected, and selected test units in each test item. The test items to be selected window 304 displays the full range of test items from which desired test items can be selected, and the full range of test units in each test item from which desired test units can be selected. The test items and test units are selected according to particular test requirements.

Figure 4:
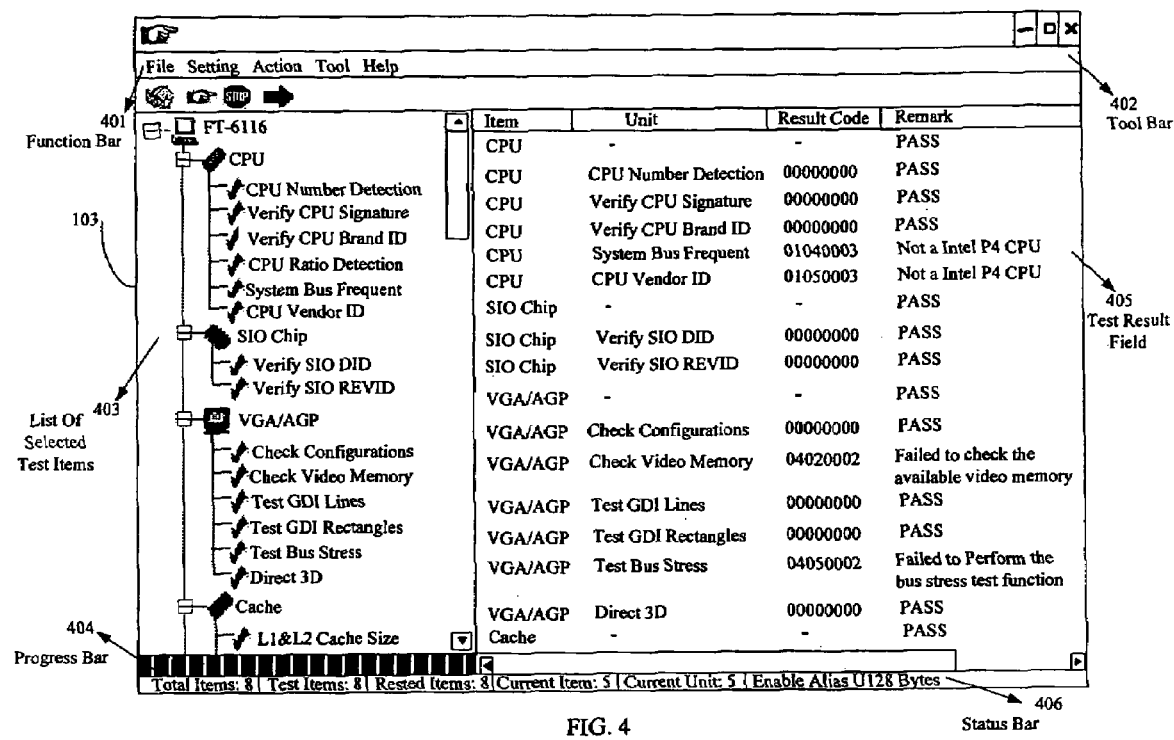
FIG. 4 is a screen capture of an exemplary test project performing interface of the system of FIG. 1.

FIG. 4 is a screen capture of an exemplary test project performing interface 103. The test project performing interface 103 is operable for loading a test script file and a test parameter configuration file, and for controlling test procedures. The test project performing interface 103 comprises a function bar 401, a tool bar 402, a list of selected test items 403, a progress bar 404, a test results field 405, and a status bar 406. The function bar 401 provides a plurality of function keys for performing test projects and controlling the test procedures. The tool bar 402 provides a plurality of shortcut keys corresponding to certain of the function keys of the function bar 401. The list of selected test items 403 displays test items which have been selected, and selected test units in each test item. The progress bar 404 displays a test status of a test project. The test results field 405 displays test results. Each of the test results includes a name of the test item, names of test units in the test item, result codes, and remark information. The status bar 406 displays current test status information on the test project.

Although the present invention has been specifically described on the basis of a preferred embodiment and preferred method, the invention is not to be construed as being limited thereto. Various changes and modifications may be made to the embodiment and method without departing from the scope and the spirit of the invention.

What is claimed is:

1. A system for testing hardware devices, the system having a multi-level architecture comprising:
a Graphical User Interface (GUI) level for selecting test items and test units for a test project based on test requirements, storing the test project in a test script file, setting standard information on the hardware devices to be tested as test parameters, configuring the test parameters for performing the test project, and storing the test parameters in a test parameter configuration file;
a Dynamic Link Library (DLL) level for transmitting test results of each hardware device to the GUI level; and
a device driving level comprising a device driving module for obtaining test information on each hardware device, comparing the test information on the hardware devices with the test parameters in the test parameter configuration file, and generating test results according to comparison results.

2. The system according to claim 1, wherein the GUI level comprises:
a test project editing interface for selecting test items and test units for the test project based on test requirements, and storing the test project in the test script file;
a test parameter configuring interface for configuring the test parameters for performing the test project, and generating the test parameter configuration file; and
a test project performing interface for loading the test script file and the test parameter configuration file, controlling test procedures, and displaying the test results.

3. The system according to claim 1, wherein the DLL level comprises a DLL module and a plurality of Application Programming Interfaces (APIs), the DLL module transmitting the test results to the GUI level via a corresponding one of the APIs.

4. The system according to claim 1, wherein the device driving module comprises a plurality of Windows Kernel Driver (WKD) programs, for driving hardware devices in order to obtain the test information on the hardware devices.

5. The system according to claim 1, wherein the device driving level further comprises a plurality of device driving interfaces for transmitting the test results to the DLL level.

6. A computer-based method for testing hardware devices, the method utilizing a multi-level system architecture, and comprising the steps of:
providing a Graphical User Interface (GUI) level, a Dynamic Link Library (DLL) level, and a device driving level;
selecting test items and test units for a test project, and storing the test project in a test script file;
setting standard information on the hardware devices to be tested as test parameters;
configuring the test parameters, and generating a test parameter configuration file for storing the test parameters;
loading the test script file and the test parameter configuration file;
loading a DLL file corresponding to one of the test items in the test script file;
loading a device driving interface corresponding to the DLL file;
testing a hardware device corresponding to the test item based on the test configuration file, comprising:
obtaining test information on the tested hardware device;
comparing the test information on the hardware devices with the test parameters in the test parameter configuration file, and generating comparison results; and
recording test results according to the comparison results;
transmitting the test results to the DLL level;
closing the device driving interface; and
determining whether any test items have not been tested, and displaying the test results if all test items have been tested.

7. The method according to claim 6, further comprising the step of loading a DLL file corresponding to a next one of the test items, if there are any test items that have not been tested.

8. A method for testing hardware devices, comprising the steps of:
providing a Graphical User Interface (GUI) to allow user selecting of test items corresponding to said hardware devices via said GUI;
grouping said selected test items into an executable test project to perform testing selected ones of said hardware devices based on said test project;
retrieving test parameters for each of said selected test items according to standard information of said selected hardware devices;
retrieving test information from said selected hardware devices corresponding to said selected test items of said test project;
acquiring test results according to comparison of said test information and said test parameters; and
showing said test results via said GUI together with and corresponding to said selected test items in said test project.

9. The method according to claim 8, further comprising the step of loading a Device Driving Interface corresponding to each of said selected test items before said test information-retrieving step to facilitate performing of said test information-retrieving step.

* * * * *